United States Patent [19]

Rowton et al.

[11] 4,436,843

[45] Mar. 13, 1984

[54] HIGH-RESILIENCE POLYURETHANE FOAMS HAVING IMPROVED RESISTANCE TO SHRINKAGE

[75] Inventors: Richard L. Rowton; Michael Cuscurida, both of Austin, Tex.

[73] Assignee: Texaco Inc., White Plains, N.Y.

[21] Appl. No.: 450,590

[22] Filed: Dec. 17, 1982

[51] Int. Cl.$^3$ .............................................. C08G 18/14
[52] U.S. Cl. ..................................... 521/167; 521/904; 521/914
[58] Field of Search ........................ 521/167, 904, 914

[56] References Cited

U.S. PATENT DOCUMENTS 3,112,281  11/1963  Gromacki et al. .................. 521/167
3,535,307  10/1970  Moss et al. ......................... 521/167
4,111,865   9/1978  Seefried et al. .................... 525/131
4,284,728   8/1981  Demou et al. ...................... 521/904

OTHER PUBLICATIONS

Buist (Ed.), *Developments in Polyurethane,* Allied, London, 1978, pp. 124 and 125.

*Primary Examiner*—Maurice J. Welsh
*Attorney, Agent, or Firm*—Jack H. Park; Kenneth R. Priem; David L. Mossman

[57] ABSTRACT

High-resilience polyurethane foams made from polyols which are alkylene oxide adducts of alkylenediamines have been found to have surprisingly improved resistance to shrinkage. These foams have particular utility as seating support because they can be molded with good processing characteristics yet contain open cells and resist shrinkage. It is preferred that the polyols used be based on ethylenediamine.

4 Claims, No Drawings

HIGH-RESILIENCE POLYURETHANE FOAMS HAVING IMPROVED RESISTANCE TO SHRINKAGE

BACKGROUND OF THE INVENTION

1. Field of the Invention

The invention relates to high-resilience polyurethane foams and more particularly relates to high-resilience polyurethane foams made from mixed alkylene oxide adducts of alkylene diamines.

2. Other Relevant Products in the Field

Polyurethane foams are the most important seating support materials available today. They are made in the form of slabs, which are cut-to-shape, or they are molded to meet specific needs.

Molded foams are commonly of the "high-resilience" (HR) type, and are characterized by high sag factors and improved hysteresis curves compared to the usual slab foams. Unfortunately, HR foams tend to have a high percentage of closed cells, which causes foams to be "tight" and shrink, and detracts from various physical properties. While the use of so-called "polymer polyols" helps to control cell structures, molded and slab HR foams generally have to be crushed in order to give the foams sufficient "breathability".

Most of the molded HR foams manufactured today go into automotive seating. With the recent advent of "in-frame" molding, foams cannot be crushed easily. It, therefore, has become much more important that foams be inherently "open". Unfortunately, generally, as foams are "opened up" by various techniques, the foams will also "process" more poorly. That is, there will be problems with large cells, poor surfaces, etc.

It has now been discovered that certain polyols can be used in otherwise conventional HR foam formulations to give molded HR foams which exhibit improved resistance to tightness and shrinkage—but without sacrifice of processing characteristics. These polyols are alkylene oxide adducts of alkylene diamines. While other alkylene oxide adduct polyols are known, none have been discovered to give improved openness in high-resilience foams.

U.S. Pat. No. 3,535,307 teaches that high molecular weight polyether block polymers may be prepared by the sequential alkoxylation of a polyfunctional initiator with alkylene epoxide components to provide polyether polyols that can be used in the preparation of polyurethanes with improved properties. Further, U.S. Pat. No. 4,111,865 contains descriptions of polymer polyol compositions useful in polyurethane foams having utility as seat cushions with improved static fatigue and humidity sensitivity properties. The polyols here are polyoxypropylene-polyoxyethylene polyols having critical polyoxypropylene and polyoxyethylene contents, hydroxyl functionalities, hydroxyl numbers and primary hydroxyl group contents. Two initiators used in the examples therein ae diethylenetriamine and ethylenediamine. Subsequently, the polymer polyols are made by polymerizing acrylonitrile and styrene in the ethylenediamine polyols. It should be emphasized that the ethylenediamine polyols described in U.S. Pat. No. 4,111,865 are intermediates to the polymer polyol end product which forms the invention therein. It was unrecognized that the ethylenediamine polyols themselves had unique physical properties.

SUMMARY OF THE INVENTION

The invention concerns a high-resilience (HR) foam, having improved resistance to shrinkage, obtained by reacting in the presence of a blowing agent and a catalyst of polyurethane formation, an organic polyisocyanate and a polyol comprising an ethylene oxide-capped alkoxylated alkylenediamine adduct where the alkylenediamine has from two to twelve carbon atoms.

DETAILED DESCRIPTION OF THE PREFERRED EMBODIMENTS

It has been surprisingly discovered that certain specific polyols, when used in molded HR foams, imparts to those foams improved openness. This improved characteristic makes it unnecessary for foam that has been in-frame molded to be crushed to achieve "breathability".

These polyols are the alkylene oxide adducts of certain alkylenediamines. The alkylenediamines should have between two and twelve carbon atoms and two primary amino groups. These diamine initiators may be represented by the formula $H_2H-(CH_2)_x-NH_2$ where x is from two to about twelve. Ethylenediamine is a preferred initiator.

The alkylenediamine is first reacted with an alkylene oxide that is higher; i.e., has more carbon atoms than ethylene oxide. Propylene oxide, 1,2-butylene oxide, etc. would be included in this definition. Generally, the two reactants, diamine and oxide, are mixed together in the presence of a basic catalyst, such as potassium hyroxide, and heated for a period of time. For more information, see the description outlined in U.S. Pat. No. 3,535,307, incorporated herein by reference. The proportions of higher alkylene oxide to diamine depend on the ultimate molecular weight of the adduct desired. With regard to the foam of this invention, propylene oxide is the preferred alkylene oxide for the first stage adduct of the diamine.

Subsequently, the higher alkylene oxide adduct is reacted with ethylene oxide to terminate the reaction. This technique is also known as "capping" the polyol with ethylene oxide. The reaction is conducted similarly to the technique described above. The molecular weight of the resulting polyol should be between about 4,000 and 10,000 with up to 15 wt.% of the molecule as ethylene oxide. As would be expected, the final polyol useful herein has at least four terminal hydroxyl groups to react with the polyisocyanate to make the final polyurethane foam. The hydroxyl number of the final polyol should be between 25 and 45.

The alkylenediamine-based polyols described above should be used in conjunction with other polyols to form the foams of this invention. Preferably, the alkylenediaminebased polyol comprises 50 to 90 weight percent of the total polyol component. High rise foams generally require a blend of polyols. The balance of the polyol component is polymer polyol. Low molecular weight chain extender type materials could also conceivably be used.

To prepare polyurethanes using the polyols here, any aromatic polyisocyanate may be used. Typical aromatic polyisocyanates include m-phenylene diisocyanate, p-phenylene diisocyanate, polymethylene polyphenylisocyanate, 2,4-toluene diisocyanate, 2,6-toluene diisocyanate, dianisidine diisocyanate, bitolylene diisocyanate, naphthalene-1,4-diisocyanate, xylylene-1,4-diisocyanate, xylylene-1,3-diisocyanate, bis(4-isocyanatophenyl)methane, bis(3-methyl-4isocyanatophenyl)methane, bis(3-methyl-4-isocyanatophenyl)methane, and 4,4'-diphenylpropane diisocyanate.

Greatly preferred aromatic polyisocyanates used in the practice of the invention are 2,4- and 2,6-toluene diisocyanates and methylene-bridged polyphenyl polyisocyanate mixtures which have a functionality of from about 2 to 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Most preferred methylene-bridged polyphenyl polyisocyanate mixtures used here contain about 20 to about 100 weight percent methylene diphenyldiisocyanate isomers, with the remainder being polymethylene polyphenyl polyisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'L -isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

The amount of hydroxyl-containing polyol component to be used relative to the isocyanate compound in both polyester and polyether foams normally should be such that the isocyanate groups are present in at least an equivalent amount, and preferably, in slight excess, compared with the free hydroxyl groups. Preferably, the ingredients will be proportioned so as to provide from about 0.9 to about 1.5 mole equivalents of isocyanate groups per mole equivalent of hydroxyl groups.

When water is used, the amount of water, based on the hydroxyl compound, is suitably within the range of about 0.05 mole to about 10.0 moles per mole equivalent of hydroxy compound.

It is within the scope of the present invention to utilize an extraneously added inert blowing agent such as a gas or gas-producing material. For example, halogenated low-boiling hydrocarbons, such as trichloromonofluoromethane and methylene chloride, carbon dioxide, nitrogen, etc. may be used. The inert blowing agent reduces the amount of excess isocyanate and water that is required in preparing flexible urethane foam. Selection of the proper blowing agent is well within the knowledge of those skilled in the art. See for example U.S. Pat. No. 3,072,082.

Catalysts useful in the preparation of flexible polyurethane foams of this invention, based on the combined weight of the hydroxyl-containing compound and polyisocyanate are employed in an amount of from about 0.03 to about 4.0 weight percent. More often, the amount of catalyst used is 0.06 to about 2.0 weight percent.

The catalysts of this invention may be catalysts such as tertiary amines or organic tin compounds or other polyurethane catalysts. The organic tin compound, particularly useful in making flexible foams may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Such tertiary amines include trialkylamines (e.g., trimethylamine, triethylamine), heterocyclic amines, such as N-alkylmorpholines (e.g., N-methylmorpholine, N-ethylmorpholine, etc.), 1,4-dimethylpiperazine, triethylenediamine, etc., and aliphatic polyamines, such as N,N,N'N'-tetramethyl-1,3-butanediamine.

Conventional formulation ingredients are also employed, such as, for example, foam stabilizers, also known as silicone oils or emulsifiers. The foam stabilizer may be an organic silane or siloxane. For example, compounds may be used having the formula:

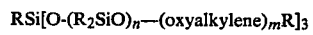

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

In preparing a flexible foam, the ingredients may be simultaneously, intimately mixed with each other by the so-called "one-shot" method to provide a foam by a one-step process. In this instance, water should comprise at least a part (e.g. 10% to 100%) of the blowing agent. The foregoing methods are known to those skilled in the art, as evidenced by the following publication: duPont Foam Bulletin, "Evaluation of Some Polyols in One-Shot Resilient Foams", Mar. 22, 1960.

The invention will be illustrated further with respect to the following specific examples, which are given by way of illustration and not as limitations on the scope of this invention.

EXAMPLE I

This example will illustrate the preparation of the ethylenediamine (EDA) polyol of this invention.

Step 1. Preparation of Initiator for EDA-based Polyol

Into a 10-gallon kettle were charged 10 pounds of the 4 mole propylene oxide adduct of EDA and 1,000 g of 45% aqueous potassium hydroxide. The reactor was then evacuated and purged with prepurified nitrogen. The reaction charge was then heated to 100° C. and stripped to a water content of 0.15–0.25%. Propylene oxide (31.1 pounds) was then reacted at 105°–110° C. at 40 psig over a two to three hour period. After a two hour digestion, the product was cooled to ambient temperature and drained from the kettle. The initiator had the following properties:

| | |
|---|---|
| Alkalinity, mg KOH/g | 22.15 |
| Hydroxyl number, corrected, mg KOH/g | 185.9 |
| Water, wt.% | 0.01 |
| Viscosity, cs, 77° F. | 7138 |

| | |
|---|---|
| Viscosity, cs, 100° F. | 2158 |

Step 2. Preparation of EDA Polyol

Five pounds of the EDA-based initiator from the above was charged to the 10-gallon kettle. Maintaining a nitrogen purge, the reaction charge was heated to 100° C. and is water content checked. The initiator water content should be less than 0.05% before propylene oxide addition was begun. Propylene oxide (33.5 pounds) was then reacted at 105°–110° C. at 50 psig. Approximately six to seven hours were required for addition of the propylene oxide. The reaction mixture was then digested two hours to an equilibrium pressure and purged 30 minutes with nitrogen. The product was then capped with 4.65 pounds of ethylene oxide. After digestion, the product was neutralized with 320 g of 25% aqueous oxalic acid or with 300 g of magnesium silicate. Di-t-butyl-p-cresol (22.7 g) and Hyflo Supercel filter aid (100 g) were also added at this point. The neutralized product was then vacuum stripped to a minimum pressure at 105° C., nitrogen stripped and filtered. The finished product had the following properties:

| | W[1] | X[2] | Y[2] |
|---|---|---|---|
| Amine content, meq/g | 0.2 | 0.2 | 0.19 |
| Hydroxyl number, meq KOH/g | 27.2 | 27.6 | 27.7 |
| Water, wt.% | 0.02 | 0.02 | 0.03 |
| pH in 10:6 isopropanol/water | 9.1 | 9.1 | 9.2 |
| Color, Pt—Co | 20–25 | 15–20 | 15–20 |
| Sodium, ppm | 0.1 | 0.1 | 0.1 |
| Potassium, ppm | 1.8 | 1.0 | 1.1 |
| Peroxide, ppm | 0.45 | 1.0 | 1.0 |
| Viscosity, cs, 77° F. | 1389 | 1428 | 1413 |
| Viscosity, cs, 100° F. | 703 | 707 | 738 |
| Primary hydroxyl, % | 78 | 80 | 72 |
| Specific gravity, 25/25° C. | — | — | 1.0156 |
| Flash point, Pensky-Martins, °F. | — | — | 405 |
| PO/EO (NMR) | — | 87/14 | 87/13 |

[1]Neutralized with oxalic acid
[2]Neutralized with synthetic magnesium silicate

EXAMPLE II

This example is the first experiment in which it was recognized the potential effectiveness, from the standpoint of cell control, of an EDA-based polyol in HR foams.

Foams were made by a hand-mix procedure commonly used in foam laboratories. Formulations are shown in Table 1. Foam A is an HR foam that is typical of those in commercial use. Foam B is identical to A except that the polyol is EDA-based, prepared as described in Example I.

TABLE 1

| HR Foam Formulations for Polyol Comparison | | |
|---|---|---|
| Formulation, pbw | A | B |
| THANOL ® SF-5505 polyol[a] | 70 | — |
| Polyol W (from Example I) | — | 70 |
| NIAX ® 34-28 polymer polyol[b] | 30 | 30 |
| Water | 3.4 | 3.4 |
| NIAX L-5309 surfactant[c] | 1.5 | 1.5 |
| Catalysts, | | |
| THANCAT ® TD-33[d] | 0.35 | 0.35 |
| NIAX A-1[e] | 0.15 | 0.15 |
| THANCAT DM-70[f] | 0.30 | 0.30 |
| WITCO ® UL-1[g] | 0.01 | 0.01 |
| TDI/MRS (80/20) isocyanate[h] | 41.3 | 40.6 |

TABLE 1-continued

| HR Foam Formulations for Polyol Comparison | | |
|---|---|---|
| Formulation, pbw | A | B |
| NCO index = 1.02 | | |

[a]A 5,000 molecular weight highly reactive triol in commercial use, sold by Texaco Chemical Co.
[b]An HR foam polymer polyol, hydroxyl number 28, sold by Union Carbide Corp.
[c]An HR foam silicone surfactant sold by Union Carbide Corp.
[d]A 33 wt.% solution of triethylenediamine in propylene glycol sold by Texaco Chemical Co.
[e]Bis[beta-(N,N—dimethylamino)alkyl]ether made under U. S. Patent 3,330,782 by Union Carbide Corp.
[f]A blend of 70% THANCAT DMDEE and 30% THANCAT DMP, sold by Texaco Chemical Co.
[g]An organotin catalyst available from Witco Chemical Co.
[h]An 80/20 pbw blend of toluene diisocyanate and MONDUR ® MRS polymeric isocyanate.

Amounts of ingredients sufficient to fill a 6"×6½"×12" long cake box were used. Foams were cured for 30 minutes at 250° F., then cut in half vertically. The inherent breathability of each foam was determined with a Gurley Densometer.

Results

Both Foams A and B had the same appearance; that is, both were fine-celled typical hand-mixed HR foams that stood up well. But Foam A had a breathability of 4 ml of air/second, while Foam B allowed 7 ml of air to pass per second. Thus, Foam B, made from an EDA-based polyol, was 75% more "open" than Foam A, made from a standard HR foam polyol.

EXAMPLE III

Here the utility of our invention is exemplified by actual foam machine runs. Run conditions are shown below.

| | |
|---|---|
| Foam machine | Admiral |
| Mixing technique | Masterbatch |
| Mold | Automotive back |
| Mold temperature, initial, °F. | 125 ± 5 |
| Mold temperature, final, °F. | 160 ± 5 |
| Mixer speed, rpm | 6,000 |
| Nozzle size, inches diameter | 1 |
| Pour rate, lbs/minute | 75 |
| Component temperatures, °F. | |
| Isocyanate | 70 |
| Masterbatch | 80 |
| Demold time, minutes | 8 |
| Crush conditions | |
| 30 seconds rest prior to crush | 3-2-1-1 |
| Crush sequence, inches | |
| Post cure, 250° F., minutes | 30 |

Comparisons of the various foams are shown in Table 2.

It is evident from the table that foams based on Polyol Z processed better (quality at demold, effect of crushing, etc.) than those based on commercial polyols commonly used in HR molded foams. But at the same time, foams based on Polyol Z exhibited very little, if any, shrinkage upon standing without crushing. (Compare Run C with D and Runs E and F with G). Other foam properties showed improvement also, notably ball rebound and compression sets.

Some of the terms may need defining. For example, "health bubbles" refers to bubbles of escaping gas that rise to the surface of the expanding foam and burst. The "weep holes time" relates to the time elapsing between when a foam is poured into the bottom of a mold, and the point in time when the expanding foam first issues from a bleeder "weep" hole at the top of the mold. "Overfill" relates to the total weight of the foam that has escaped out the top of all the bleeder or weep holes in a mold. "CLD loss" stands for "compression load deflection" loss after humid aging, a common test run on urethane foams familiar to one skilled in the art. Finally, compression set percent concerns the percent of original deflection according to Method B of ASTM D-2406.

TABLE 2

Comparisons of Machine Made HR Foams

| | C | D | E | F | G |
|---|---|---|---|---|---|
| Formulation, pbw | | | | | |
| Polyol Z[a] | 60 | — | 70 | 60 | — |
| NIAX 12-35[b] | — | 60 | — | — | — |
| THANOL SF-5505 | — | — | — | — | 70 |
| NIAX 34-28 | 40 | 40 | 30 | 40 | 30 |
| Water | 3.1 | 3.1 | 4.1 | 4.1 | 4.1 |
| Silicone NIAX L-5309 | 1.5 | 1.5 | 1.5 | 2.0 | 1.5 |
| Catalyst THANCAT TD-33 | 0.4 | 0.4 | 0.4 | 0.35 | 0.40 |
| NIAX A-1 | 0.12 | 0.12 | 0.12 | 0.08 | 0.12 |
| THANCAT DM-70 | 0.30 | 0.30 | 0.30 | 0.30 | 0.30 |
| WITCO UL-1 | 0.01 | 0.01 | 0.01 | 0.0075 | 0.01 |
| Isocyanate TDI/MRS (80/20) | 37.5 | 38.3 | 48.1 | 48.1 | 48.8 |
| NCO index | 1.02 | 1.02 | 1.02 | 1.02 | 1.02 |
| Reaction Characteristics | | | | | |
| Pour time, seconds | 7.50 | 7.50 | 6.20 | 6.20 | 6.10 |
| Cream time, seconds | 4 | 5 | 6 | 5 | 4.5 |
| Rise time, seconds (to top of box) | 51 | 54 | 35 | 42 | 35 |
| Health bubbles, seconds | 71 | 82 | 68 | 77 | 93 |
| Time to weep holes, seconds, 1st-last | 37/50 | 37/51 | 31/50 | 36/53 | 32/51 |
| Overfill, g | 13 | 18 | 22 | 17 | 13 |
| Foam Physical Properties | | | | | |
| Quality at demold time | Excellent | Fair | Good | Fair | Poor Surface |
| Effect of crushing | No set | No set | No set | — | Poor Recovery |
| Thickness, inches | 3.75 | 3.70 | 3.72 | 3.72 | 3.57 |
| Core density, pcf | 2.28 | 2.29 | 1.79 | 1.76 | 1.84 |
| ILD, lb/50 in | | | | | |
| 25% | 22 | 25 | 22 | 24 | 24 |
| 50% | 41 | 46 | 41 | 44 | 46 |
| 65% | 67 | 75 | 68 | 73 | 78 |
| 25% R | 18 | 20 | 17 | 18 | 17 |
| Tensile, psi | 19 | 21 | 18 | 17 | 20 |
| Elongation, % | 168 | 180 | 145 | 134 | 155 |
| Tear, pli | 1.49 | 1.67 | 1.34 | 1.44 | 1.44 |
| Ball rebound, % | 53 | 46 | 53 | 50 | 42 |
| Comp. set (Method B), 50% | 18 | 23 | 16 | 14 | 31 |
| Comp. set (Method B), 75% | 17 | 22 | 17 | 14 | 28 |
| Humid Aging (ASTM 1564) | | | | | |
| CLD loss, % | 9 | 26 | 16 | 20 | 24 |
| Comp. set, 50% | 29 | 30 | 44 | 39 | 56 |
| Shrinkage on standing, uncrushed | None | Bad | Very Slight | None | Moderate |

[a] A polyol prepared as in Example I but on a 100-gallon scale.
[b] A commerical HR foam triol of 35 hydroxyl number, sold by Union Carbide Corp.

Many modifications may be made in the foam of this invention without departing from the spirit and scope of the invention which is defined only in the appended claims. For example, the foam component proportions and conditions could be modified by one skilled in the art to maximize the openness-producing characteristics of this particular polyol material.

We claim:

1. A high-resilience polyurethane foam having improved resistance to shrinkage, obtained by reacting in the presence of a blowing agent and a catalyst of polyurethane formation, an organic polyisocyanate and a polyol component comprising 10 to 50 weight percent of a polymer polyol and 50 to 90 weight percent of a polyol which is an ethylene oxide-capped propoxylated ethylenediamine adduct having a molecular weight in the range from about 4,000 to 10,000, a hydroxyl number in the range from 25 to 45 and an ethylene oxide content of up to 15%, where the resultant foam possesses improved openness in the absence of subsequent crushing.

2. An improved, high-resilience polyurethane foam having improved resistance to shrinkage, obtained by reacting within a mold in the presence of a blowing agent and a catalyst of polyurethane formation, an organic polyisocyanate and a polyol component, the improvement comprising that 50 to 90 weight percent of the component is a polyol made by the process comprising a. reacting ethylenediamine with excess propylene oxide to provide an alkoxide adduct polyol, and
   b. capping the adduct polyol by reacting it with ethylene oxide to produce a polyol having a molecular weight in the range from 4,000 to 10,000 and containing up to 15% ethylene oxide, suitable to provide improved resistance to shrinkage for high-resilience polyurethane foam and to eliminate the need for subsequent crushing of the foam to obtain improved openness and 10 to 50 weight percent of the component is a polymer polyol.

3. A method for making a high-resilience polyurethane foam having improved resistance to shrinkage comprising reacting in the presence of a blowing agent and a catalyst of polyurethane formation, an organic polyisocyanate and a polyol component comprising 10 to 50 weight percent of a polymer polyol and 50 to 90 weight percent of a polyol which is an ethylene oxide-capped propoxylated ethylenediamine having a molecular weight in the range from about 4,000 to 10,000, a hydroxyl number in the range from 25 to 45 and an ethylene oxide content of up to 15%, where the resultant foam possesses improved openness in the absence of subsequent crushing.

4. The method of claim 3 in which the reaction occurs within a mold.

* * * * *